United States Patent

[11] 3,632,366

[72] Inventors Hisao Hiraga;
 Syunichi Ito; Keitaro Inoue; Hideharu Hosoya, all of Yokohama-shi, Japan
[21] Appl. No. 787,604
[22] Filed Dec. 27, 1968
[73] Assignee Asahi Glass Company, Ltd. Tokyo, Japan
[32] Priority Jan. 11, 1968
[33] Japan
[31] 43/1095

[54] METHOD OF PRODUCING MOLDABLE REINFORCED THERMOPLASTIC MATERIAL
9 Claims, No Drawings

[52] U.S. Cl................................................ 117/4,
 117/126 GB, 260/34.2, 264/140, 264/143
[51] Int. Cl...............................................C03c 25/02,
 B41k 3/28
[50] Field of Search........................................... 117/4, 126
 GR; 260/34.2, 29.6 EM, 29.6 AC

[56] References Cited
UNITED STATES PATENTS

| | | | |
|---|---|---|---|
| 3,508,309 | 4/1970 | Beaudoin et al. | 117/126 |
| 3,403,069 | 9/1968 | Benson | 117/4 |
| 2,238,956 | 4/1941 | Strother | 260/29.6 EM |

*Primary Examiner*—Alfred L. Leavitt
*Assistant Examiner*—M. F. Esposito
*Attorneys*—Ralph E. Bucknam, Jesse D. Reingold, Robert R. Strack and Henry A. Marzullo, Jr.

ABSTRACT: A process for producing moldable reinforced thermoplastic material which comprises impregnating filaments with an aqueous emulsion of thermoplastic resin containing a small amount of organic solvent, drying said impregnated filaments to remove water and the organic solvent and then chopping said filaments into granules, thereby obtaining fiber reinforced thermoplastic material in the form of granules in which thermoplastic resin particles coalesce firmly with one another and adhere firmly to filaments, thus providing useful material for injection or extrusion molding into desirable reinforced finished shaped articles.

METHOD OF PRODUCING MOLDABLE REINFORCED THERMOPLASTIC MATERIAL

The present invention relates to a method for producing moldable fiber-reinforced thermoplastic material, and more particularly, it relates to a method for producing moldable polyvinyl chloride granules reinforced with glass fibers, from an aqueous emulsion of polyvinyl chloride or a copolymer of vinyl chloride and glass fiber filaments.

In regard to the manufacture of moldable fiber-reinforced thermoplastic material, a number of suggestions have hitherto been disclosed one of which involves the usage of an aqueous emulsion of a thermoplastic resin. Although aqueous emulsions of thermoplastic resins can be easily impregnated into reinforcing fiber filaments, thermoplastic resin particles in the filaments do not generally adhere firmly with one another nor to filaments. For instance, when glass fiber filaments are immersed in an aqueous emulsion of polyvinyl chloride, a desired quantity of emulsion can temporarily adhere to glass fibers. However, when these glass fiber-reinforced filaments are dried, a powder of polyvinyl chloride is obtained, which is separated from the glass fibers. To overcome this difficulty, it has been proposed to flux the material by heating after drying as described in U.S. Pat. No. 2,877,501, but this process requires a higher temperature, and further the application of this process is limited to the specific resins having film-forming properties. Accordingly, aqueous emulsions of polyvinyl chloride can not substantially be used for the manufacture of moldable fiber-reinforced thermoplastic granular material.

A principal object of the present invention is to provide a method for producing moldable fiber-reinforced thermoplastic material.

Another object of the present invention is to provide a method for producing moldable fiber-reinforced thermoplastic granular material from aqueous emulsions of thermoplastic resins and fiber filaments.

A further object of the present invention is to provide a method for producing moldable reinforced thermoplastic material in which thermoplastic resin particles coalesce firmly with one another and adhere firmly to fibers.

Other objects and advantageous features of the present invention will be apparent from the following description of the invention.

These above-mentioned objects of the present invention are accomplished by a process according to the present invention, which comprises the steps of:

1. Impregnating reinforcing fiber filaments with an aqueous emulsion of a thermoplastic resin containing an organic solvent. The organic solvent should be capable of partially swelling or dissolving the resin particles and in an amount ranging from 2 to 50 percent by weight of the resin.

2. Drying the thus treated filaments to remove water and organic solvents, thereby causing the resin particles to coalesce firmly with one another and adhere firmly to fibers. The material obtained after drying is chopped into granules.

The thermoplastic resin employed in the present invention is a polymer or copolymer of olefinically unsaturated compounds, such as vinyl chloride, vinylidene chloride, vinyl acetate, alkyl acrylates, alkyl methacrylates, alkyl maleates, maleic anhydride, styrene, acrylonitrile, ethylene, propylene and others, and mixture of these polymers or copolymers. According to the present invention, a thermoplastic resin having no film-forming property such as polyvinylchloride, or a copolymer of vinyl chloride with a minor amount of comonomer, may be used advantageously. Suitable copolymers which may be employed are those having more than 80 percent by weight of vinyl chloride and at least one of vinylidene chloride, vinyl acetate, alkyl acrylates, alkyl methacrylates, alkyl maleates and maleic anhydride in amount less than 20 percent by weight. These polymers or copolymers have to be employed in the form of an aqueous emulsion of resin particles which may range from 0.01 to 5 microns in size. This emulsion may be prepared by conventional methods. Various kinds of latices containing some amount of emulsifying agent are available commercially and are produced by emulsion polymerization or by emulsification of solid resin powders. All of these latices can be used advantageously.

The organic solvents used in the present invention are selected depending on the kind of thermoplastic resins and should be able to partially swell or dissolve the resin particles. Such solvents involve hydrocarbons, such as benzene, toluene, xylene, ethyl benzene, diethyl benzene and heptane; halogenated hydrocarbons, such as tetrachloromethane, dichloroethane, hexachloroethane, perchloroethylene and chlorobenzene; ketones, such as acetone, methyl ethyl ketone, diethyl ketone and cyclohexanone; esters, such as butyl acetate, amyl acetate and dimethyl phthalate; ethers, such as dioxane, trioxane and tetrahydrofuran; glycols, such as ethylene glycol and propylene glycol; and polymerizable monomers, such as styrene, divinylbenzene, methyl acrylate, methyl methacrylate, vinyl acetate, acrylonitrile, glycidyl methacrylate and ethylene glycol dimethacrylate. Some polymerizable liquid monomers may be used as the organic solvent and this solvent will give improved properties by self-polymerization. The amount of solvent to be mixed varies depending on the kind of resin and solvent. An excessive amount of solvent rather destroys the emulsion and brings about various disadvantages and difficulties on drying and molding. Too small amount of solvent makes accomplished of the objects impossible. The quantity of solvent used has to be selected in a range from 2 to 50 percent by weight, preferably from 6 to 30 percent by weight of resin in the emulsion; and the solvent may be added to the emulsion alone or in mixture with other solvents or water. In order to distribute the solvent homogeneously into the emulsion, an emulsifying agent may preferably be added. Coloring materials, stabilizers, polymerization catalysts for polymerizable monomers, fillers, plastizers, lubricants and other conventional additives may be added, if desired.

An aqueous emulsion of a thermoplastic resin containing an organic solvent has an appearance similar to an aqueous emulsion free from organic solvent, but the adhesiveness of the resin particles is remarkably improved. As a result, when the reinforcing fiber filaments are impregnated with an aqueous emulsion and dried, the resin particles coalesce or adhere firmly with one another and to the fibers to form a continuous rod. Thus, for instance, resin particles of polyvinyl chloride or a copolymer of more than 80 percent of vinyl chloride and less than 20 percent of a comonomer having poor adhesiveness to glass fibers can provide moldable reinforced resinous material capable of being used for injection or extrusion molding.

Fibers used in the present invention involve glass fibers, rock wool, asbestos, jute and other fibrous materials capable of being used for the reinforcement of plastics. Fibers have to be in the form of filaments, especially multifilaments such as strands or rovings.

The impregnation of fiber filaments with aqueous emulsion of the present invention may be achieved by immersing or passing the fiber filaments in or through aqueous emulsion. In order to control the proportion of resin to fiber filaments, squeezing by holes, rollers or doctor-knife may be adopted and the impregnation may also be repeated.

The drying of fiber filaments impregnated with aqueous emulsion is effected at temperatures of from room temperature to 180° C., preferably from 70° to 140° C., whereby water and a part or substantially the entire of solvent are removed. A part of polymerizable monomer s polymerized in the course of drying. The drying is achieved by contact with hot gas, irradiation with infrared rays or other means. When the removal of any undesirable components contained in emulsion, for instance, an emulsifying agent is desired, the dried material is further washed with warm water or a suitable solvent. Impregnation and drying can be applied repeatedly. Dried material or rod is chopped into granules of appropriate length from 5 to 25 mm., preferably from 7 to 17 mm.

The dried or hardened granular material thus manufactured contains 5 to 60 percent by weight of fiber and is rich in void.

Fibers are uniformly distributed in the material. Further, any resin particles coalesce firmly with one another and adhere firmly to fiber filament. Thus, the granular material obtained according to the process of the present invention can be molded into desired shapes by conventional molding means under heat and pressure.

The molding may be accomplished in various manners. The appropriate temperature and pressure vary depending on the kind of resin, and molding means. Polymerization of polymerizable monomers is completed under molding temperatures and pressure. Injection, extrusion, transfer or compression molding may be adopted advantageously.

The moldable material of the present invention may reach freely and gradually into every corner of the mold cavity under heat and pressure without uneven distribution of the fiber.

The invention is further described in the following examples which are illustrative but not limitative thereof.

EXAMPLE 1

Vinyl chloride was emulsion polymerized in the presence of ammonium laurate emulsifier to give a latex of polyvinyl chloride having average degree of polymerization 1,100 and total solid content 47 percent. To 1,065 parts by weight of this latex was added 185 parts by weight of an homogeneously emulsified mixture having the following components and ratio:

| | |
|---|---|
| xylene | 10 parts by weight |
| ester type plasticizer (DOP) | 10 parts by weight |
| tin mercaptide type stabilizer | 3 parts by weight |
| ester wax type lubricant | 1.2 parts by weight |
| ammonium laurate emulsifier | 1.0 parts by weight |
| water | 11.8 parts by weight |

60 end glass fiber roving treated with vinyl silane was passed through the bath of above mixed emulsion and vertical drying tower at the speed of 12 m./hr. continuously. Temperature of drying tower (1.5 m. height) was maintained at 100° C. at the bottom inlet, and at 160° C. at the top outlet by a current of hot air. The dried roving was chopped into granules of 10 mm. length, 3 mm. diameter. The granules contained 32 percent glass fiber. The polymer was uniformly distributed among the filaments throughout the granule and all filaments were bonded tightly by the resin.

This granular material was molded into a plate of 3 mm. thickness under an injection pressure of 100 kg./cm.$^2$ and at a cylinder temperature of 190–195° C., by use of "In line screw type injection molding machine" having the 26 mm. screw diameter. The properties of the product were measured as follows:

| | Testing method | Product obtained from the moldable granule of this invention | Control* |
|---|---|---|---|
| Flexural strength, kg./mm.$^2$ | ASTM D-790. | 15.8 | 10.2 |
| Flexural modulus, kg./mm.$^2$ | ASTM D-790. | 582 | 365 |
| Izod impact strength, ft. lb./in. notch. | ASTM D-256 | 5.4 | 0.56 |
| Deflection temperature, ° C./264 p.s.i. | ASTM D-648. | 98 | 59 |
| Shrinkage under heat | *JIS K-6745 | −0.3 | −2.65 |

*JIS: Japanese Industrial Standards.

The control sample was prepared with the same molding machine from rigid polyvinyl chloride pellets of the following composition:

| | |
|---|---|
| polyvinyl chloride | 100 parts by weight |
| tin mercaptide type stabilizer | 3.5 parts by weight |
| ester wax type lubricant | 1.0 parts by weight |

EXAMPLE 2

567 parts by weight of vinyl chloride-ethyl acrylate copolymer latex (weight ratio of vinyl chloride-ethyl acrylate 95:5, average degree of polymerization 1,350 and total solid content 53 percent were mixed with a mixture of the following composition.

| | |
|---|---|
| toluene | 60 parts by wt. |
| tin mercaptide type stabilizer | 9 parts by wt. |
| ester wax type lubricant | 3 parts by wt. |
| ammonium laulate emulsifier | 2.4 parts by wt. |
| water | 48.6 parts by wt. |

120 end glass fiber roving treated with vinylsilane was passed through the bath of the above mixed emulsion and vertical drying tower at the speed of 10 m./hr. continuously. Temperature of drying tower (1.5 m. height) was maintained at 100° C. at the bottom inlet and at 120° C. at the top outlet Dried roving or rod was chopped into granules of 10 mm. length, 3.5 mm. diameter. Said granule had 29.1 percent glass fiber content.

This granular material was extrusion-molded into bar of 10 mm. diameter by means of a extrusion molding machine having screw of 20 mm. diameter, 400 mm. length and revolving 150 r.p.m., under the condition of cylinder temperature 162–165°C., die head temperature 169–171° C. and back pressure of 30 kg./cm.$^2$.

The molded product had excellent thermal properties and the thermal expansion coefficient according to ASTM D-696 was measured as $1.98 \times 10^{-5}$/°C., while the similarly produced nonreinforced control sample bar having the following composition had the thermal expansion coefficient of $5.30 \times 10^{-5}$/°C.

| | |
|---|---|
| polyvinyl chloride | 100 parts by wt. |
| tri basic lead sulphate | 2.5 parts by wt. |
| di basic lead stearate | 0.5 parts by wt. |
| lead stearate | 2.0 parts by wt. |
| barium stearate | 0.5 parts by wt. |
| cadmium stearate | 0.6 parts by wt. |
| ester wax type lubricant | 0.5 parts by wt. |

EXAMPLE 3

100 parts by weight of polymethyl methacrylate latex (total solid content 50 percent manufactured by the emulsion polymerization of methyl methacrylate were mixed under stirring with the mixture of following compositions:

| | |
|---|---|
| toluene | 10 |
| water | 10 |
| emulsifier | 1 | sixty end glass fiber roving was passed through the bath of the above mixed emulsion and dried and chopped as described in example 1, thus obtaining granular material of 10 mm. length, 3 mm. diameter and 31 percent glass fiber content.

This granular material was injection molded into the plate of 3 mm. thickness by the same injection molding machine, under the same molding condition as in example 1, except that the cylinder temperature was maintained at 175°–179° C. A product of excellent dimension stability under heat was obtained.

EXAMPLE 4

Granular material of 10 mm. length, 3.1 mm. diameter and 29 percent glass fiber was manufactured as described in example 3, except that styrene-butadiene-acrylonitrile copolymer latex (50 percent total solid content, weight ratio of styrene-butadiene-acrylonitrile 40:30:30) was used in place of polymethyl methacrylate latex. This granular material was injection molded into the circular plate of 6 mm. thickness and 50 mm. diameter with precise shape and dimension.

What we claim is:

1. A method of producing moldable glass fiber-reinforced thermoplastic granular material which consists of forming an aqueous emulsion of a thermoplastic resin containing an emulsifying agent, adding to the aqueous emulsion an organic solvent capable of partially swelling the resin particles in an amount ranging from 2 to 50 percent by weight of the resin, impregnating glass fiber filaments with said aqueous emulsion containing the organic solvent, drying the filaments thus treated to remove water and the organic solvent, thereby causing the resin particle to coalesce firmly with one another and adhere firmly to the glass fiber filaments and then chopping the dried and adhered filaments into granules.

2. A method as claimed in claim 1, wherein the thermoplastic resin is polyvinyl chloride.

3. A method as claimed in claim 1, wherein the thermoplastic resin is a copolymer of more than 80 percent of vinyl chloride and less than 20 percent of a comonomer.

4. A method as claimed in claim 1, wherein the comonomer is selected from the group consisting of vinylidene chloride, vinyl acetate, alkyl acrylates, alkyl methacrylates, maleic anhydride and alkyl maleates.

5. The method according to claim 1, wherein at least one member selected from the group consisting of coloring agents, stabilizers, polymerization catalysts, fillers, plasticizers and lubricants is added to said aqueous emulsion containing said organic solvent.

6. The process according to claim 1, wherein the finished articles contain between 5 and 60 percent of fibers.

7. The process according to claim 1, wherein vinyl chloride is emulsion polymerized in the presence of ammonium laurate, a latex of polyvinyl chloride of 1,100 average degree of polymerization and 47 percent total solid content is obtained, glass fibers are treated with an emulsion of said latex in the presence of xylene, a plasticizer, a lubricant and a stabilizer, and drying is carried out at a temperature of 160° C.

8. A method as claimed in claim 1, wherein the solvent is selected from the group consisting of hydrocarbons, halogenated hydrocarbons, ketones, esters and ethers.

9. A method as claimed in claim 8, wherein the solvent is selected from the group consisting of xylene and toluene.

* * * * *